(12) United States Patent
Justusson et al.

(10) Patent No.: US 10,997,330 B2
(45) Date of Patent: May 4, 2021

(54) SYSTEM AND METHOD FOR PREDICTING FAILURE INITIATION AND PROPAGATION IN BONDED STRUCTURES

(71) Applicant: THE BOEING COMPANY, Chicago, IL (US)

(72) Inventors: Brian P. Justusson, Saint Peters, MO (US); Joseph D. Schaefer, Richmond Heights, MO (US); Matthew Jeffrey Molitor, O'Fallon, MO (US)

(73) Assignee: THE BOEING COMPANY, Chicago, IL (US)

(*) Notice: Subject to any disclaimer, the term of this patent is extended or adjusted under 35 U.S.C. 154(b) by 302 days.

(21) Appl. No.: 16/274,868

(22) Filed: Feb. 13, 2019

(65) Prior Publication Data
US 2020/0257768 A1 Aug. 13, 2020

(51) Int. Cl.
*G06F 30/23* (2020.01)
*G06F 111/10* (2020.01)
*G06F 113/26* (2020.01)

(52) U.S. Cl.
CPC .......... *G06F 30/23* (2020.01); *G06F 2111/10* (2020.01); *G06F 2113/26* (2020.01)

(58) Field of Classification Search
None
See application file for complete search history.

(56) References Cited

U.S. PATENT DOCUMENTS

| 2015/0254382 A1* | 9/2015 | Bolander | G06F 17/18 703/2 |
| 2016/0224698 A1* | 8/2016 | Rassaian | G06F 30/20 |
| 2020/0210635 A1* | 7/2020 | Washburn | G06Q 10/04 |

OTHER PUBLICATIONS

De, MANE 4240/ CIVL 4240: Introduction to Finite Elements, Abaqus Handout, © Rensselaer Polytechnic Institute, 61 pgs.
Du, "eXtended Finite Element Method (XFEM) in Abaqus" www.360.com, Dassault Systèmes, 61 pgs.
Du, et al. "Finite Element Analysis on the Crack Growth and Stress Intensity Factor for the Contact Fatigue", International Conference on Materials Sciences and Nanomaterials, IOP Conf. Series: Materials Science and Engineering 230 (2017) 012038, 9 pgs.
(Continued)

*Primary Examiner* — Craig C Dorais
(74) *Attorney, Agent, or Firm* — Moore Intellectual Property Law, PLLC (57) ABSTRACT

A method includes obtaining failure initiation characteristics of a bonding layer of one or more bonded structures and determining, based on the failure initiation characteristics, a first characteristic dimension for each analysis element of a first portion of a finite element analysis model. The method includes obtaining failure propagation characteristics of the bonding layer and determining, based on the failure propagation characteristics, a second characteristic dimension for each analysis element of a second portion of the model. The method includes assigning a first set of material parameters to analysis elements of the first portion of the model and assigning a second set of material parameters to analysis elements of the second portion of the model. The method includes evaluating failure modes of the one or more bonded structures based on a solution to the model, the first set of material parameters, and the second set of material parameters.

20 Claims, 4 Drawing Sheets

(56) References Cited

OTHER PUBLICATIONS

May, et al. "Modelling Mode I Crack Initiation in Composites Under Fatigue Loading Using Interface Elements", Advanced Composites Centre for Innovation and ScienceUniversity of Bristol, 10 pgs.

Tippabhotla, "Introduction to Finite Element Analysis using ANSYS", Xtreme Photovoltaics (XPV) Lab EPD, SUTD, 40 pgs.

\* cited by examiner

SYSTEM AND METHOD FOR PREDICTING FAILURE INITIATION AND PROPAGATION IN BONDED STRUCTURES

FIELD OF THE DISCLOSURE

The present disclosure is generally related to predicting failure initiation and propagation in bonded structures.

BACKGROUND

Aerospace structures are typically bonded together, such as by bonding metal to metal, composite to composite, or metal to composite. If bonded structures are subjected to too much stress, delamination or disbond can occur. One technique for performing failure analysis on a bonded structure is the virtual crack closure technique (VCCT). The VCCT determines if a failure is going to grow from a known failure based on facture mechanics of the composite material. One problem with the VCCT is that a failure state (e.g., a damage state) must be known or assumed ahead of time. The VCCT lacks the ability to predict the onset of the failure (e.g., damage). Additionally, the VCCT approach uses determinate analysis sweeps to create response surfaces and design spaces, which can be extremely manual (e.g., require analysis and input from an engineer) and use extensive engineering judgment to place the failure a-priori. Additionally, determining the location of the failure may require extensive manual analysis and materials testing. Thus, use of the VCCT can be labor intensive.

SUMMARY

In a particular implementation, a method of predicting failure initiation and propagation of one or more bonded structures includes obtaining failure initiation characteristics of a bonding layer of one or more bonded structures. The method includes determining, based on the failure initiation characteristics, a first characteristic dimension for each analysis element of a first portion of a finite element analysis model. The first portion corresponds to a first portion of the bonding layer. The method includes obtaining failure propagation characteristics of the bonding layer. The method includes determining, based on the failure propagation characteristics, a second characteristic dimension for each analysis element of a second portion of the finite element analysis model. The second portion corresponds to a second portion of the bonding layer. The method includes assigning a first set of material parameters of the bonding layer to analysis elements of the first portion of the finite element analysis model. The method includes assigning a second set of material parameters of the bonding layer to analysis elements of the second portion of the finite element analysis model. Values of the one or more material parameters of the first set of material parameters are different from corresponding values of the one or more material parameters of the second set of material parameters. The method further includes evaluating failure modes of the one or more bonded structures based on a solution to the finite element analysis model, the first set of material parameters, and the second set of material parameters.

In another particular implementation, an apparatus for predicting failure initiation and propagation of one or more bonded structures includes a processor and a memory coupled to the processor and storing instructions executable by the processor to perform operations including obtaining failure initiation characteristics of a bonding layer of one or more bonded structures. The operations include determining, based on the failure initiation characteristics, a first characteristic dimension for each analysis element of a first portion of a finite element analysis model. The first portion corresponds to a first portion of the bonding layer. The operations include obtaining failure propagation characteristics of the bonding layer. The operations include determining, based on the failure propagation characteristics, a second characteristic dimension for each analysis element of a second portion of the finite element analysis model. The second portion corresponds to a second portion of the bonding layer. The operations include assigning a first set of material parameters of the bonding layer to analysis elements of the first portion of the finite element analysis model. The operations include assigning a second set of material parameters of the bonding layer to analysis elements of the second portion of the finite element analysis model. Values of the one or more material parameters of the first set of material parameters are different from corresponding values of the one or more material parameters of the second set of material parameters. The operations further include evaluating failure modes of the one or more bonded structures based on a solution to the finite element analysis model, the first set of material parameters, and the second set of material parameters.

In another particular implementation, a computer-readable storage device stores instructions that, when executed by a processor, cause the processor to perform operations including obtaining failure initiation characteristics of a bonding layer of one or more bonded structures. The operations include determining, based on the failure initiation characteristics, a first characteristic dimension for each analysis element of a first portion of a finite element analysis model. The first portion corresponds to a first portion of the bonding layer. The operations include obtaining failure propagation characteristics of the bonding layer. The operations include determining, based on the failure propagation characteristics, a second characteristic dimension for each analysis element of a second portion of the finite element analysis model. The second portion corresponds to a second portion of the bonding layer. The operations include assigning a first set of material parameters of the bonding layer to analysis elements of the first portion of the finite element analysis model. The operations include assigning a second set of material parameters of the bonding layer to analysis elements of the second portion of the finite element analysis model. Values of the one or more material parameters of the first set of material parameters are different from corresponding values of the one or more material parameters of the second set of material parameters. The operations further include evaluating failure modes of the one or more bonded structures based on a solution to the finite element analysis model, the first set of material parameters, and the second set of material parameters.

DETAILED DESCRIPTION

Particular implementations are described with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining", "calculating", "generating", "adjusting", "modifying", etc. may be used to describe how one or more operations are performed. It should be noted that such terms are not to be construed as limiting and other techniques may be utilized to perform similar operations. Additionally, as referred to herein, "generating", "calculating", "using", "selecting", "accessing", and "determining" may be used interchangeably. For example, "generating", "calculating", or "determining" a parameter (or a signal) may refer to actively generating, calculating, or determining the parameter (or the signal) or may refer to using, selecting, or accessing the parameter (or signal) that is already generated, such as by another component or device. Additionally, "adjusting" and "modifying" may be used interchangeably. For example, "adjusting" or "modifying" a parameter may refer to changing the parameter from a first value to a second value (a "modified value" or an "adjusted value"). As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

The present disclosure describes systems and methods to predict failure initiation and propagation of bonded structures, such as composite parts or other adhesively, or cohesively, bonded structures. The systems and methods described herein do not use the VCCT. Instead, the techniques disclosed herein include modeling a bonding layer of a bonded structure as a cohesive element in a finite element analysis model. For example, a finite element analysis model representing the bonding layer may be generated and modeled as a cohesive element. However, in order to predict initiation of a failure, such as delamination, disbond, decohesion, separation, or aggregation of micro cracks that cause a structural level failure, element lengths of the analysis elements are set to be very small, such as less than 0.01 inches. Because of these small element sizes, a finite element analysis solver uses significant computational resources over a long duration of time to attempt to solve the finite element analysis model, such that many computers may lack the computation resources to be able to solve the model.

To remedy this problem, the present disclosure describes systems and methods for generating a finite element analysis model for the bonding layer having portions with different element lengths. The material parameters associated with portion of the finite element analysis model are scaled differently based on differences in the analysis elements. For example, analysis elements of each portion of the finite element analysis model have a different characteristic dimension, such as an element length (e.g., size). Thus, a portion having analysis elements with a small characteristic dimension can be used for predicting initiation of a failure, and other portions having analysis elements with larger characteristic dimensions can be used for predicting propagation of the failure. By scaling the material parameters, such as cohesive strength, of analysis elements of each portion based on the corresponding characteristic dimension, portions of the finite element analysis model having different characteristic dimensions can properly model failure propagation (based on failure propagation characteristics of the bonded structure). Thus, a finite element analysis layer having analysis elements with larger characteristic dimensions can be used to model portions of the bonding layer, which can significantly reduce the amount of time and the amount of processing resources used to solve the finite element analysis model (and thus to predict the initiation and propagation of a failure in the bonding layer).

Figure 1:
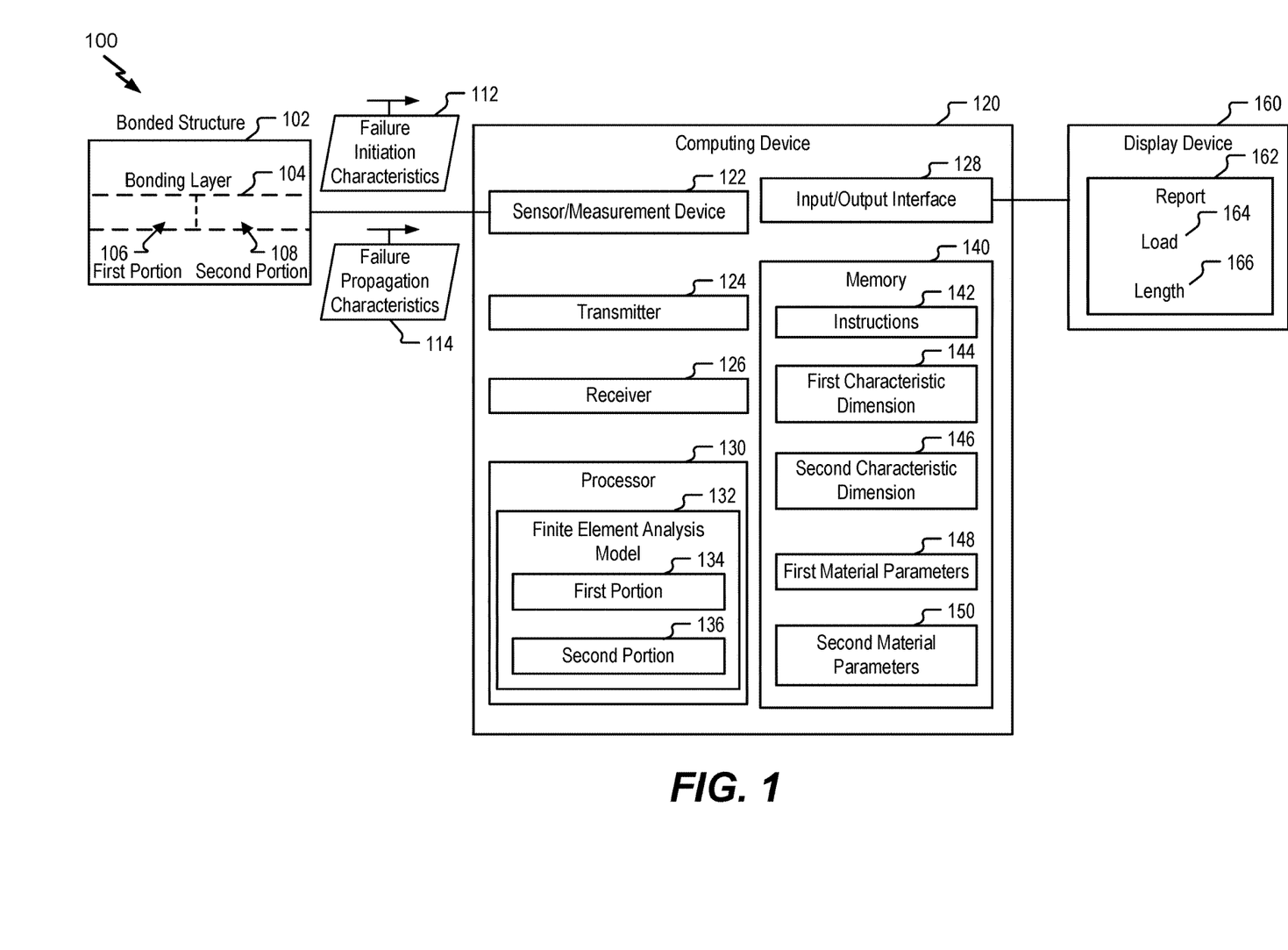
FIG. 1 is a block diagram that illustrates a particular implementation of a system that predicts failure initiation and propagation in bonded structures.

FIG. 1 illustrates an example of a particular implementation of a system 100 that predicts failure initiation and propagation in bonded structures. The system 100 includes a bonded structure 102, a computing device 120, and a display device 160. Although the display device 160 is illustrated in FIG. 1 as being external to the computing device 120, in other implementations the display device 160 is included in or integrated within the computing device 120.

The bonded structure 102 includes any type of structure where multiple layers are bonded together. In a particular implementation, the bonded structure 102 includes a composite part, such as one or more plies that are adhesively bonded together. In other implementations, the bonded structure 102 includes other types of materials, such as metals, laminates, etc., that are adhesively bonded or co-bonded together. For example, the bonded structure 102 can included aluminum bonded to aluminum, as a non-limiting example. As other examples, the bonded structure 102 can include structures that are co-cured or co-bonded, with or without adhesive. In some implementations, the bonded structure 102 includes a first metal bonded to a second metal, a first composite bonded to a second composite, or a metal bonded to a composite. The bonded structure 102 can also include metals or composites bonded to honeycomb cores. The bonded structure 102 also can include unitized composite structures. In some implementations, the bonded structure 102 is used as part of an aircraft, an unmanned aerial vehicle (UAV) (e.g., a drone aircraft), an automobile, a train, a motorcycle, a bus, a ship or boat, a rocket, a spacecraft, an autonomous vehicle, or another vehicle, as illustrative, non-limiting examples.

The bonded structure 102 includes a first layer that is bonded to a second layer by a bonding layer 104. The first layer and the second layer can include the same type of materials or include different types of materials. As a non-limiting example, the first layer includes a first ply, the second layer includes a second ply, and the bonding layer 104 includes an adhesive layer. In other implementations, the bonding layer 104 represents an interface or joint between the first layer and the second layer. Thus, in at least some implementations, the bonding layer 104 does not include adhesive (e.g., the first layer is co-bonded to the second layer without adhesive). The bonded structure 102, including the bonding layer 104, can be studied to determine various characteristics, as further described herein.

The computing device 120 includes a sensor 122 (e.g., a measurement device), a transmitter 124, a receiver 126, a processor 130, an input/output interface 128, and a memory 140. In other implementations, one or more of the sensor 122, the transmitter 124, the receiver 126, the input/output interface 128, the processor 130, and the memory 140 may be optional, or additional components can be included in the computing device 120. In a particular implementation, the computing device 120 includes or corresponds to a desktop computer, a laptop computer, a tablet computer, a server, a mainframe, a mobile device (e.g., a mobile telephone), or any other type of computing device.

The sensor 122 is configured to perform measurements on the bonded structure 102 to determine characteristics of the bonded structure 102, such as failure initiation characteristics 112 and failure propagation characteristics 114. For example, the sensor 122 enables performance of testing according to one or more American Society for Testing and Materials (ASTM) standards. As non-limiting examples, the testing includes ASTM D3039 (or similar testing) for Mode I Strength, ASTM D3518 (or similar testing) for Mode II Strength, ASTM D5528 (or similar testing) for Mode I Toughness, and ASTM D7905 (or similar testing) for Mode II Toughness. The testing results in the determination of particular parameters, such as cohesive strength and fracture toughness, and other parameters, such as penalty stiffness, are determined based on rules or underlying mathematical models. These particular parameters correspond to the failure initiation characteristics 112 and the failure propagation characteristics 114.

The transmitter 124 is configured to enable the computing device 120 to send data to one or more other devices via direct connection or via one or more networks, and the receiver 126 is configured to enable the computing device 120 to receive data from one or more other devices via direct connection or via one or more networks. The one or more networks may include Institute of Electrical and Electronics Engineers (IEEE) 802 wireless networks, Bluetooth networks, telephone networks, optical or radio frequency networks, or other wired or wireless networks. Although illustrated as distinct components, in other implementations, the transmitter 124 and the receiver 126 are replaced with a transceiver that enables sending and receipt of data from one or more other devices.

The input/output interface 128 is configured to receive input from one or more input devices, provide output to one or more output devices, or both. In some implementations, the input/output interface 128 conforms to one or more standard interface protocols, such as serial interfaces (e.g., universal serial bus (USB) interfaces or IEEE interface standards), parallel interfaces, display adapters, audio adapters, or custom interfaces. In some implementations, the input/output interface 128 is configured to communicate with one or more input/output devices, such as some combination of buttons, keyboards, pointing devices, displays, speakers, microphones, touch screens, and other devices. In a particular implementation, the input/output interface 128 is configured to communicate with the display device 160.

The processor 130 is configured to execute instructions 142 stored at the memory 140 to perform the operations described herein. For example, the processor 130 is configured to generate and solve a finite element analysis model 132 based on the bonding layer 104 of the bonded structure 102, as further described herein. The finite element analysis model 132 is generated using a finite element analysis solver (not shown) stored at the memory 140.

The memory 140 includes volatile memory devices (e.g., random access memory (RAM) devices), nonvolatile memory devices (e.g., read-only memory (ROM) devices, programmable read-only memory, and flash memory), or both. The memory 140 is configured to store the instructions 142 that are executed by the processor 130 to perform the operations described herein. The memory 140 is also configured to store data used to solve the finite element analysis model 132, such as characteristic dimensions associated with the finite element analysis model 132 and sets of material parameters, as further described herein.

During operation, the computing device 120 obtains the failure initiation characteristics 112 and the failure propagation characteristics 114 of the bonding layer 104 of the bonded structure 102. For example, manual or automated testing is performed on the bonded structure 102 to determine the failure initiation characteristics 112 and the failure propagation characteristics 114. In a particular implementation, the failure initiation characteristics 112 and the failure propagation characteristics 114 are generated by the sensor 122 (e.g., during testing of the bonded structure 102). In other implementations, the failure initiation characteristics 112 and the failure propagation characteristics 114 are received from another device (e.g., via the receiver 126), are received via user input (e.g., via the input/output interface 128), or are pre-stored at the memory 140. In some implementations, the failure initiation characteristics 112 and the failure propagation characteristics 114 correspond to delamination, disbond, decohesion, or separation of the bonded structure 102.

In a particular implementation, the failure initiation characteristics 112 and the failure propagation characteristics 114 include a penalty stiffness, a cohesive strength, and a fracture toughness. The penalty stiffness is a numeric calibration for the finite element analysis solver that is based on the stiffness of the two bodies (e.g., the first layer and the second layer) that are in contact. The cohesive strength is a measure of the bonding between the particles of the bonding layer 104 and is an experimentally determined value. The fracture toughness is a measure of the ability of the bonding layer 104 to resist fracture and is an experimentally determined value. The failure initiation characteristics 112 and the failure propagation characteristics 114 are defined by strength and fracture mechanics, respectively, for initiation and transition to propagation of a failure, and can include physical properties and underlying mathematical model parameters.

After obtaining the failure initiation characteristics 112 and the failure propagation characteristics 114, the processor 130 generates the finite element analysis model 132 corresponding to the bonding layer 104 of the bonded structure 102. For example, the processor 130, using a finite element analysis solver program, generates a model that represents the bonding layer 104. In a particular implementation, the bonding layer 104 corresponds to a cohesive element in the finite element analysis model 132. Although described as modeling a bonding layer, in other implementations, the finite element analysis model 132 models transitions between layers or transitions between structures, such as in an assembly.

In a particular implementation, the finite element analysis model 132 is generated and solved (e.g., analyzed) without use of a predetermined failure location. For example, there is no later input of a failure location. Instead, the finite element analysis model 132 is used to predict the initiation of the failure in the bonding layer 104, based on the failure initiation characteristics 112. Because the finite element analysis model 132 is generated and solved without use of a predetermined failure location, extensive testing of the bonded structure 102 is not required nor is a user that uses engineering judgment to place the failure in the correct location. Thus, manpower and testing time are reduced by use of the finite element analysis model 132.

The finite element analysis model 132 includes a plurality of portions that correspond to different portions of the bonding layer 104. Each portion of the finite element analysis model 132 can be referred to as a mesh (e.g., a collection of elements that are used to discretize geometry of the model), or a portion of a mesh. To illustrate, the processor 130 generates a first portion 134 of the finite element analysis model 132 that corresponds to a first portion 106 of the bonding layer 104. The first portion 106 of the bonding layer 104 is a portion in which a failure is estimated to initiate. In some implementations, the failure is estimated at a region of interest, such as a free edge, an edge of a flange, a feature such as a notch, or at another location of the bonded structure 102.

Characteristics of the first portion 134 of the finite element analysis model 132 are determined based on the failure initiation characteristics 112. To illustrate, the processor 130 determines, based on the failure initiation characteristics 112, a first characteristic dimension 144 for each analysis element of the first portion 134 of the finite element analysis model 132. Each analysis element of the finite element analysis model 132 is defined by nodes and edges (e.g., connections) between nodes. For example, an analysis element corresponds to an area or volume defined by four edges connected to four nodes, as illustrated with reference to FIG. 2. The first characteristic dimension 144 can include an element length, a length of an edge that defines the analysis element.

The first characteristic dimension 144 is selected based on the failure initiation characteristics 112. To illustrate, in order to correctly predict failure initiation, conservation of energy between the elastic energy stored in the analysis element and the fracture toughness is maintained. This results in the length of the analysis element (e.g., the first characteristic dimension 144) being governed by the following inequality:

$$l_e < \frac{2G_C E}{\sigma_C^2}$$

where $l_e$ is the length of the analysis element, $G_C$ is the fracture toughness, E is the penalty stiffness, and $\sigma_C$ is the cohesive strength. For common material systems, this can result in analysis element lengths on the order of 0.01 inches (e.g., for the first characteristic dimension 144) for the first portion 134 of the finite element analysis model 132.

In a particular implementation, the first portion 134 of the finite element analysis model 132 corresponds to a crack tip process zone. To illustrate, the processor 130 estimates a crack tip process zone corresponding to a failure in the bonding layer 104. The crack tip process zone represents a region of damage surrounding the failure. In this implementation, the first characteristic dimension 144 is based at least on a size of the crack tip process zone. For example, the element length of analysis elements of the first portion 134 of the finite element analysis model 132 is selected such that the first portion 106 of the bonding layer 104 encompasses the crack tip process zone.

After generating the first portion 134 of the finite element analysis model 132, the processor 130 generates a second portion 136 of the finite element analysis model 132. The second portion 136 of the finite element analysis model 132 corresponds to a second portion 108 of the bonding layer 104 of the bonded structure 102. To generate the second portion 136, the processor 130 determines a second characteristic dimension 146 for each analysis element of the second portion 136 of the finite element analysis model 132. The second characteristic dimension 146 is determined based on the failure propagation characteristics 114. To illustrate, after determining the crack tip process zone, the processor 130 identifies the second portion 108 of the bonding layer that is in a direction of propagation of the failure. Because the failure has already been initiated, the second characteristic dimension 146 is determined based on the failure propagation characteristics 114 instead of the failure initiation characteristics 112. Due to a difference between the failure propagation characteristics 114 and the failure initiation characteristics 112, the processor 130 may have more flexibility in selecting the second characteristic dimension 146, such as an element length of analysis elements in the second portion 136 of the finite element analysis model 132.

In a particular implementation, the second characteristic dimension 146 is different than the first characteristic dimension 144. Thus, analysis elements of the second portion 136 have a different size than analysis elements of the first portion 134. To illustrate, the second portion 136 of the finite element analysis model 132 can have analysis elements having a larger characteristic dimension than analysis elements of the first portion 134 of the finite element analysis model 132. Portions of the finite element analysis model 132 having different characteristic dimensions are illustrated and further described with reference to FIG. 2. Use of analysis elements having a larger element length (e.g., a characteristic dimension) reduces the amount of time and processing resources used to solve the finite element analysis model 132.

After the first characteristic dimension 144 and the second characteristic dimension 146 are determined, the processor 130 assigns sets of material parameters to the portions of the finite element analysis model 132. To illustrate, the processor 130 assigns a first set of material parameters 148 of the bonding layer 104 to analysis elements of the first portion 134 of the finite element analysis model 132 and the processor 130 assigns a second set of material parameters 150 of the bonding layer 104 to analysis elements of the second portion 136 of the finite element analysis model 132. Values of one or more material parameters of the first set of material parameters 148 are different from corresponding values of the one or more material parameters of the second set of material parameters 150. To illustrate, the sets of material parameters 148, 150 are assigned based on the corresponding characteristic dimensions 144, 146. If the corresponding characteristic dimensions 144, 146 are different from each other, values of the material parameters of the sets of material parameters 148, 150 are different from each other.

In a particular implementation, the first set of material parameters 148 includes a first cohesive strength based on the first characteristic dimension 144. For example, the first cohesive strength can be the cohesive strength determined by testing the bonded structure 102. In this implementation, the second set of material parameters 148 includes a second cohesive strength that is based on the second characteristic dimension 146. For example, the second cohesive strength can be scaled based on a difference between the first characteristic dimension 144 and the second characteristic dimension 146. The second cohesive strength can be different than the first cohesive strength, for example, if the first characteristic dimension 144 is different than the second characteristic dimension 146. To further illustrate, if the first characteristic dimension 144 is less than the second characteristic dimension 146, the second cohesive strength can be decreased as compared to the first cohesive strength. Using analysis elements having larger element lengths (e.g., characteristic dimensions) reduces the amount of time and amount of processing resources used to solve the finite element analysis model 132. Additionally, or alternatively, the sets of material properties can include other values, such as physical properties (as determined by testing the bonded structure 102) and numerical parameters (such as the penalty stiffness) used by the finite element analysis solver program.

In a particular implementation, the second set of material parameters 150 is assigned dynamically based on the second characteristic dimension 146. In this implementation, the processor 130 determines a direction of propagation of the failure based on a damage index associated with the bonding layer 104. For example, the second portion 108 of the bonding layer 104 is proximate to the first portion 106 in the direction of the failure. In this implementation, the processor 130 determines whether an element length of elements in the direction of the advancing failure is larger than an element length of elements in the failure region. If so (e.g., if the second characteristic dimension 146 is larger than the first characteristic dimension 144), the cohesive strength is dynamically adjusted based on the second characteristic dimension 146, as further described with reference to FIG. 3. In an alternate implementation, the first set of material parameters 148 and the second set of material parameters 150 are assigned based on predetermined values. For example, based on studies of different bonded materials, material parameters for different size analysis elements of particular materials are predetermined and stored at the memory 140 for use in assigning to the portions of the finite element analysis model 132.

Although two portions of the finite element analysis model 132, and two portions of the bonding layer 104 have been described, such examples are not limiting. In other examples, the finite element analysis model 132 and the bonding layer 104 can have any number of portions greater than or equal to two. For example, with reference to FIG. 2, the finite element analysis model 132 includes three portions, and a third set of material parameters is assigned to the third portion of the finite element analysis model 132. Using more portions with different size analysis elements allows a more gradual scaling of the analysis element length, which can enable more accurate results without dramatically increasing the processing resources required.

After assigning the first set of material parameters 148 to the first portion 134 of the finite element analysis model 132 and assigning the second set of material parameters 150 to the second portion 136 of the finite element analysis model 132, the processor 130 evaluates failure modes of the bonded structure 102 based on a solution to the finite element analysis model 132, the first set of material parameters 148, and the second set of material parameters 150. For example, the processor 130 uses the first set of material parameters 148 and the second set of material parameters 150 to solve the finite element analysis model 132. Solving the finite element analysis model 132 enables the processor 130 to predict characteristics of the failure in the bonded structure 102. In a particular implementation, evaluating the failure modes of the bonded structure 102 includes determining a load 164 associated with initiation of a failure in the bonded structure 102, determining a length 166 of propagation of the failure, or a combination thereof. For example, the processor 130 determines the load 164 based on the failure initiation characteristics 112 (and other characteristics of the bonding layer 104 or the bonded structure 102). As another example, the processor 130 determines the length 166 of the propagation of the failure based on the failure propagation characteristics 114 (and other characteristics of the bonding layer 104 or the bonded structure 102). In this implementation, the processor 130 initiates display of a report 162 that includes the load 164, the length 166 of the propagation of the failure, or a combination thereof. For example, the display device 160 is configured to display the report 162 that includes the load 164, the length 166, or both. The display device 160 can also be configured to display a visual representation of the failure modes, such as a graphical depiction of the bonding layer 104 and the failure. In some implementations, the graphical depiction includes the analysis elements (e.g., the mesh), while in other implementations, the analysis elements are not displayed.

In some implementations, the system 100 performs additional operations based on determination of the failure modes of the bonded structure 102. In a particular implementation, if the load 164 fails to satisfy (e.g., is less than) a threshold, the processor 130 issues a command to a system that is configured to manufacture bonded structures similar to the bonded structure 102 to terminate a manufacturing process. Alternatively, if the load 164 satisfies (e.g., is greater than or equal to) the threshold, the processor 130 issues a command to initiate the manufacturing process. Additionally, or alternatively, the processor 130 initiates, via the display device 160, display of an instruction to a user to terminate (or to initiate) a manufacturing process based on the determined failure modes. Similar operations can be performed based on the length 166 or other information associated with the determined failure modes.

The system 100 reduces the amount of time and processing resources used to predict initiation of and propagation of a failure in the bonded structure 102. To illustrate, multiple portions of the finite element analysis model 132 can be used to model the bonding layer 104. Increasing the element length (e.g., the characteristic dimension) of the analysis elements in portions of the finite element analysis model 132 reduces the amount of time and processing power used to solve the finite element analysis model 132. However, simply changing the element length of the analysis elements can result in incorrect modeling of the failure across the different portions of the finite element analysis model. To enable correct modeling of the failure, material properties, such as cohesive strengths, are scaled based on the element length. Thus, analysis elements having larger element sizes can be used to model portions of the bonding layer 104, which can significantly reduce the amount of time and the amount of processing resources used to solve the finite element analysis model 132 (and thus to predict the initiation and propagation of a failure in the bonding layer 104).

Figure 2:
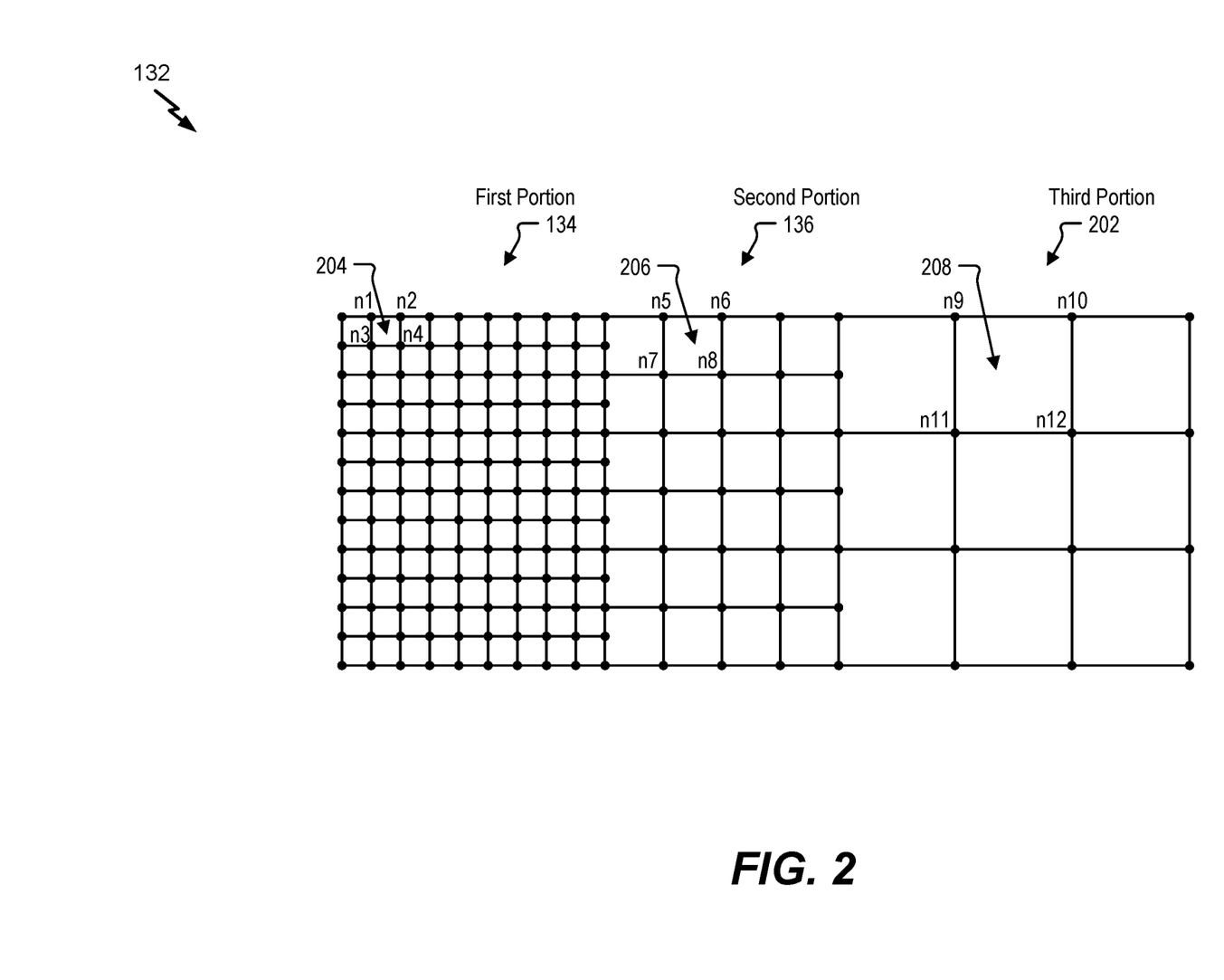
FIG. 2 illustrates a finite element analysis model of a particular layer of a bonded structure.

FIG. 2 illustrates the finite element analysis model 132 of FIG. 1. The finite element analysis model 132 models (e.g., represents) a particular layer of a bonded structure, such as the bonding layer 104 of the bonded structure 102.

The finite element analysis model 132 includes multiple portions. For example, in the example illustrated in FIG. 2, the finite element analysis model 132 includes the first portion 134, the second portion 136, and a third portion 202. In some implementations, the portions 134, 136, and 202 are referred to as meshes, or portions of a mesh.

Each portion of the finite element analysis model 132 is composed of elements. The elements are defined by nodes and edges (e.g., connections). For example, the first portion 134 includes a first element 204. The first element 204 is defined by an edge between node n1 and node n2, an edge between node n1 and node n3, an edge between node n2 and node n4, and an edge between node n3 and node n4. A characteristic dimension (e.g., an element length) of the first element 204 corresponds to the length of one of the edges, such as the edge between node n1 and node n2. The elements of the first portion 134 have an element length (e.g., the first characteristic dimension 144) that is selected based on the failure initiation characteristics 112. For example, the element length is selected based on the length of the crack tip process zone. To further illustrate, a length of the crack tip process zone is determined, and the element length is determined such that approximately three to ten elements of the first portion 134 cover the crack tip process zone. Because the crack tip process zone represents the transition between where the failure is governed by strength mechanics and where propagation of the failure is governed by fracture/toughness mechanics, the element length is selected based on the failure initiation characteristics 112. Additionally, the first set of material parameters 148, such as a first cohesive strength, is assigned to analysis elements of the first portion 134 based on the element length (e.g., the first characteristic dimension 144). For example, a cohesive strength determined by performing measurements on the bonded structure 102, as well as other initial parameters, is assigned to the analysis elements of the first portion 134.

In addition to determining the crack tip process zone, a direction of propagation of the failure is determined. In the direction of propagation, the second portion 136 is generated. The second portion 136 includes a second element 206. For example, the second element 206 is defined by an edge between node n5 and node n6, an edge between node n5 and node n7, an edge between node n6 and node n8, and an edge between node n7 and node n8. As illustrated in FIG. 2, the second element 206 is larger than the first element 204. The element length of the analysis elements of the second portion 136 is selected based on the failure propagation characteristics 114, not the failure initiation characteristics 112. Additionally, the second set of material parameters 150, such as a second cohesive strength, is assigned to analysis elements of the second portion 136 based on the element length (e.g., the second characteristic dimension 146). For example, the first cohesive strength may be scaled (e.g., decreased) based on the difference between the element length of the first portion 134 and the element length of the second portion 136 to determine the second cohesive strength that is assigned to analysis elements of the second portion 136.

The element length of analysis elements can continue to be increased in the direction of propagation of the failure. For example, the third portion 202 is generated. The third portion 202 includes a third element 208. For example, the third element 208 is defined by an edge between node n9 and node n10, an edge between node n9 and node n11, an edge between node n10 and node n12, and an edge between node n11 and node n12. As illustrated in FIG. 2, the third element 208 is larger than the second element 206. The element length of the analysis elements of the third portion 202 is selected based on the failure propagation characteristics 114. Additionally, a third set of material properties, such as a third cohesive strength, is assigned to analysis elements of the third portion 202 based on the element length. For example, the second cohesive strength may be scaled (e.g., decreased) based on the difference between the element length of the second portion 136 and the element length of the third portion 202 to determine the third cohesive strength that is assigned to analysis elements of the third portion 202. Although three portions are illustrated, in other implementations, the finite element analysis model 132 includes more than three portions having different element lengths (e.g., characteristic dimensions).

In a particular implementation, the adjustment of the cohesive strengths is performed after an entirety of the model is generated. In this implementation, pre-processing is performed as a final step after the model is built before an input file is generated to update the material parameters, such as cohesive strengths, of the various portions of the finite element analysis model 132. In an alternate implementation, the materials properties update is performed on-the-fly at each step of the analysis. In this implementation, only the material parameters in the regions near the crack tip propagation are affected. Thus, although more calculations may be performed than in the pre-processing implementation, only materials parameters in the crack tips/planes/fronts are updated.

Increasing the element length of the analysis elements reduces the amount of time and processing resources used to solve the finite element analysis model 132. Thus, failure initiation and propagation can be predicted using systems having reduced processing resources and can be determined in less time, as compared to conventional techniques of solving finite element analysis models.

Figure 3:
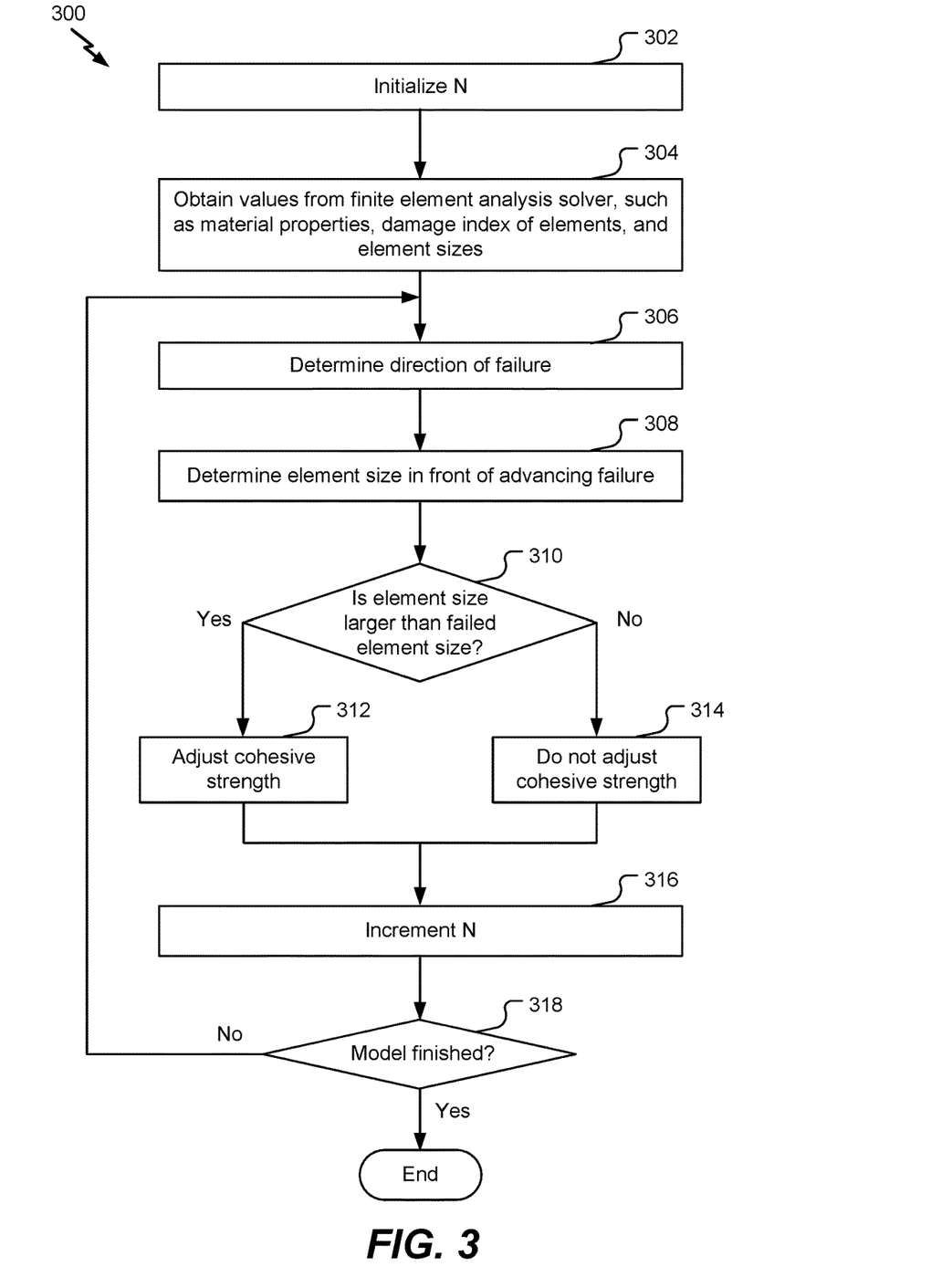
FIG. 3 is a flow chart of an example of a method of adjusting cohesive strength of analysis elements of a finite element analysis model during failure analysis.

FIG. 3 illustrates a method 300 of adjusting cohesive strength of analysis elements of a finite element analysis model during failure analysis. In a particular implementation, the method 300 is performed by the computing device 120 of FIG. 1 (e.g., by the processor 130 executing the instructions 142).

The method 300 includes initializing a counter N, at 302. N is used to represent a portion of the finite element analysis model, such as the finite element analysis model 132 of FIGS. 1-2, that is being analyzed.

The method 300 includes obtaining values from a finite element analysis solver, at 304. The values include material properties (e.g., the failure initiation characteristics 112 and the failure propagation characteristics 114), a damage index (SDV) of the analysis elements, a characteristic element length (e.g., size) of the analysis elements, and any other values used by the finite element analysis solver. The values may be determined by analyzing a bonded structure, such as the bonded structure 102 of FIG. 1. Additionally, or alternatively, the values may be selected from a list of values based on characteristics, such as material type, adhesive type, size, etc., of the bonded structure. Some of the values, such as the characteristic element length, are determined by the finite element analysis solver.

The method 300 includes determining a direction of the failure (e.g., delamination, disbond, decohesion, or separation), at 306. For example, the state variables for failure can be compared to determine a direction of a failure gradient. In a particular implementation, the direction is determined based on the damage index, and the result is the direction of the failure gradient (e.g., a direction of delamination, disbond, decohesion, or separation).

The method 300 includes determining element sizes in front of the advancing failure (e.g., the failure gradient), at 308. For example, an element length $l_e$ of the analysis elements in the Nth portion of the finite element analysis model (e.g., the portion in front of the propagating failure) is determined.

The method 300 includes determining whether the element size is larger than the failed element size. For example, the characteristic element length of the analysis elements of a first portion of the finite element analysis model (e.g., the portion where the failure is initiated) is compared to the element length $l_e$ of the elements in the Nth portion of the finite element analysis model. If the element length $l_e$ is larger than the characteristic element length, the method 300 proceeds to 312, and a cohesive strength of the analysis elements of the Nth portion of the finite element analysis model is adjusted according to the following equation, where $E_3$ is the penalty stiffness, $G_C$ is the fracture toughness, and $\sigma_C$ is the cohesive strength:

$$\sigma_C = \sqrt{\frac{ME_3 G_C}{3 l_e}}$$

Returning to 310, if the element length $l_e$ is not larger than VUCHARLENGTH, the method 300 proceeds to 314, and the cohesive strength is not adjusted.

The method 300 includes incrementing N, at 316. The method 300 further includes determining if evaluation of the finite element analysis model is finished (e.g., there is no portion after the Nth portion), at 318. If the evaluation of the finite element analysis model is finished, the method 300 terminates. If the evaluation of the finite element analysis model is not finished, the method 300 returns to 306, and the direction of the failure is determined. In this manner, cohesive strengths of multiple portions of the finite element analysis model can be scaled based on the element length.

Figure 4:
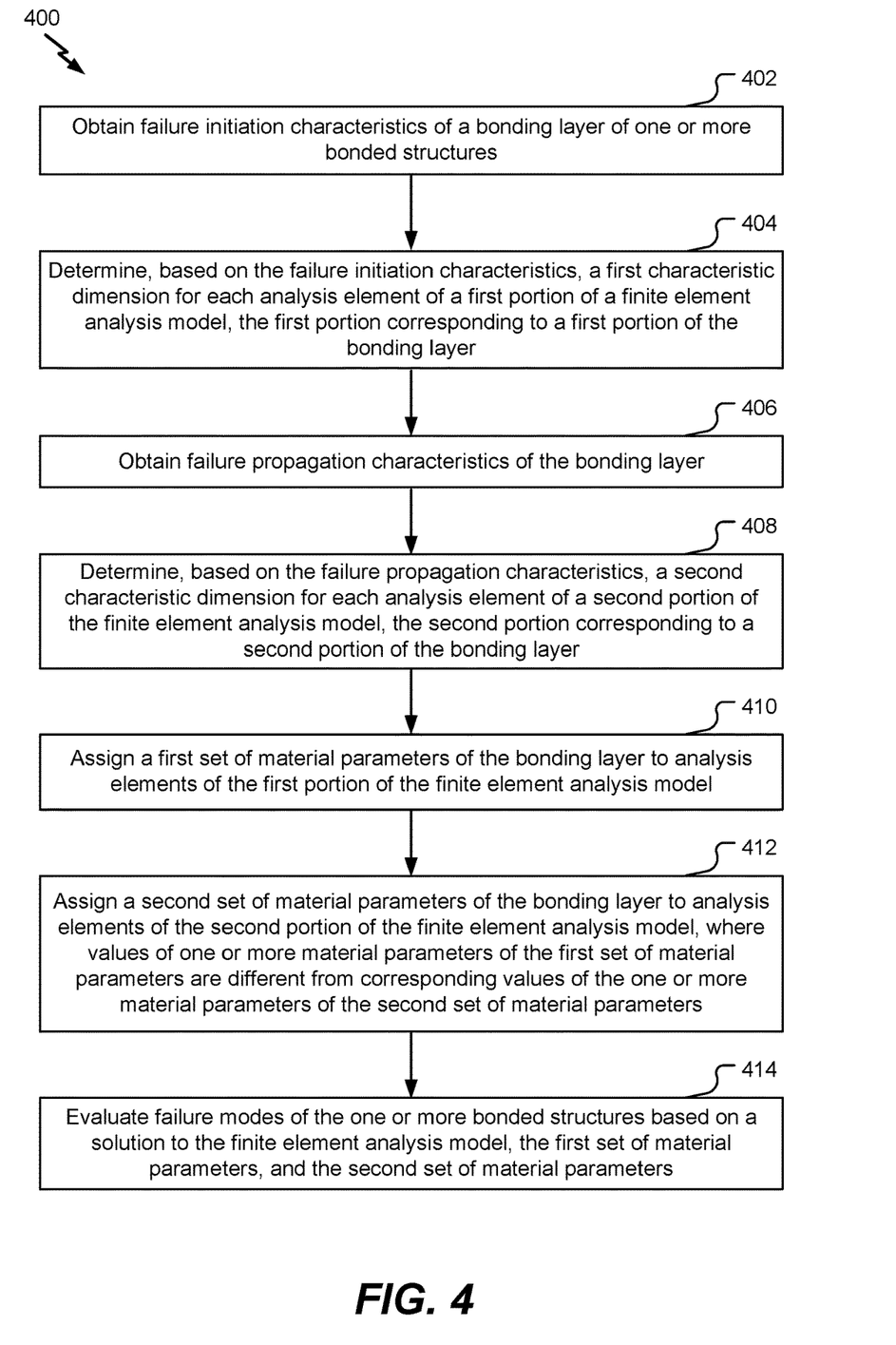
FIG. 4 is a flow chart of an example of a method of predicting failure initiation and propagation of bonded structures.

FIG. 4 illustrates a method 400 of predicting failure initiation and propagation of one or more bonded structures. In a particular implementation, the method 400 is performed by the computing device 120 of FIG. 1 (e.g., by the processor 130 executing the instructions 142).

The method 400 includes obtaining failure initiation characteristics of a bonding layer of one or more bonded structures, at 402. For example, the computing device 120 obtains the failure initiation characteristics 112 associated with the bonding layer 104 of the bonded structure 102.

The method 400 includes determining, based on the failure initiation characteristics, a first characteristic dimension for each analysis element of a first portion of a finite element analysis model, at 404. The first portion corresponds to a first portion of the bonding layer. For example, the processor 130 determines the first characteristic dimension 144 for each analysis element of the first portion 134 of the finite element analysis model 132. The first portion 134 of the finite element analysis model 132 corresponds to the first portion 106 of the bonding layer 104. As one example, the processor 130 determines the characteristic length of elements of the first portion 134 based on the failure initiation characteristics 112 to implement the first portion 134 (e.g., a first mesh) of the finite element analysis model 132. As another example, the processor 130 can receive user input of a characteristic length of analysis elements of the first portion 134 of the finite element analysis model 132. In a particular implementation, the bonding layer corresponds to a cohesive element in the finite element analysis model. In at least some implementations, the finite element analysis model is solved without use of a predetermined failure location.

The method 400 includes obtaining failure propagation characteristics of the bonding layer, at 406. For example, the computing device 120 obtains the failure propagation characteristics 114 associated with the bonding layer 104. In a particular implementation, the failure initiation characteristics and the failure propagation characteristics correspond to delamination, disbond, decohesion, or separation of the one or more bonded structures. For example, in a particular implementation, the failure initiation characteristics 112 and the failure propagation characteristics 114 correspond to delamination, disbond, decohesion, or separation of the bonded structure 102.

The method 400 includes determining, based on the failure propagation characteristics, a second characteristic dimension for each analysis element of a second portion of the finite element analysis model, at 408. The second portion corresponds to a second portion of the bonding layer. For example, the processor 130 determines, based on the failure propagation characteristics 114, the second characteristic dimension 146 for each analysis element of the second portion 136 of the finite element analysis model 132. The second portion 136 of the finite element analysis model 132 corresponds to the second portion 108 of the bonding layer 104. To further illustrate, the processor 130 determines the characteristic length of analysis elements to implement the second portion 136 (e.g., a second mesh) of the finite element analysis model 132. In a particular implementation, the second characteristic dimension is different than the first characteristic dimension. For example, the second characteristic dimension 146 has a different value than the first characteristic dimension 144.

The method 400 includes assigning a first set of material parameters of the bonding layer to analysis elements of the first portion of the finite element analysis model, at 410. For example, the processor 130 assigns the first set of material parameters 148 to analysis elements of the first portion 134 of the finite element analysis model 132. To further illustrate, the processor 130 executing the finite element solver program assigns material parameter values based on existing characteristic element lengths for the portions of the finite element analysis model 132.

The method 400 includes assigning a second set of material parameters of the bonding layer to analysis elements of the second portion of the finite element analysis model, at 412. Values of one or more material parameters of the first set of material parameter are different from corresponding values of the one or more material parameters of the second set of material parameters. For example, the processor 130 assigns the second set of material parameters 150 to analysis elements of the second portions 136 of the finite element analysis model 132. To further illustrate, the processor 130 executing the finite element solver program assigns material parameter values based on existing characteristic element lengths for the portions of the finite element analysis model 132.

The method 400 further includes evaluating failure modes of the one or more bonded structures based on a solution to the finite element analysis model, the first set of material parameters, and the second set of material parameters, at 414. For example, the processor 130 evaluates failure modes of the bonded structure 102 based on a solution to the finite element analysis model 132 using the first set of material parameters 148 and the second set of material parameters 150.

In a particular implementation, evaluation of the failure modes of the one or more bonded structures includes determining a load associated with initiation of a failure in the one or more bonded structures, determining a length of propagation of the failure, or a combination thereof. In this implementation, the method 400 can further include initiating display of a report that includes the load, the length of the propagation of the failure, or a combination thereof. For example, the display device 160 displays the report 162 that includes the load 164, the length 166, or a combination thereof.

In a particular implementation, the first set of material parameters includes a first cohesive strength and the second set of material parameters includes a second cohesive strength. The first cohesive strength is based on the first characteristic dimension and the second cohesive strength is based on the second characteristic dimension. For example, the first set of material parameters 148 includes a first cohesive strength based on the first characteristic dimension 144 and the second set of material parameters 150 includes a second cohesive strength based on the second characteristic dimension 146. In some implementations, a value of the second cohesive strength is different than a value of the first cohesive strength.

In a particular implementation, the second set of material parameters is assigned dynamically based on the second characteristic dimension. For example, the second set of material parameters 150 can be assigned dynamically by the processor 130 based on the second characteristic dimension 146. In this implementation, the method 400 can further include determining a direction of propagation of a failure based on a damage index associated with the bonding layer, as described with reference to FIG. 3. The second portion of the bonding layer is proximate to the first portion of the bonding layer in the direction of the propagation of the failure. In an alternate implementation, the first set of material parameters and the second set of material parameters are assigned based on predetermined values. For example, the first set of material parameters 148 and the second set of material parameters 150 can include predetermined values based on pre-measured characteristics of the materials that make up the bonded structure 102.

In a particular implementation, the method 400 includes determining, based on the failure propagation characteristics, a third characteristic dimension for each analysis element of a third portion of the finite element analysis model and assigning a third set of material parameters of the bonding layer to analysis elements of the third portion of the finite element analysis model. The third portion of the finite element model corresponds to a third portion of the bonding layer. For example, multiple portions are determined for the finite element model, and each portion is assigned corresponding materials parameters, as described with reference to FIG. 2.

In a particular implementation, the method 400 includes estimating a crack tip process zone corresponding to a failure in the bonding layer. The crack tip process zone corresponds to a region of damage surrounding the failure, and the first characteristic dimension is based at least on a size of the crack tip process zone. For example, the first characteristic dimension 144 (e.g., a first element size) is based on a crack tip process zone in the first portion 106 of the bonding layer 104.

The method 400 enables portions of a finite element analysis model to have larger element lengths (e.g., characteristic dimensions) than a portion in which a failure is initiated while still correctly modeling propagation of the failure due to scaling the material parameters (e.g., cohesive strengths) of the portions with the larger element lengths. Increasing the element lengths in at least some portions of the finite element analysis model reduces an amount of time and processing resources used to solve the finite element analysis model and thereby predict initiation and propagation of a failure in a bonded structure.

In some implementations, the method 300 of FIG. 3, the method 400 of FIG. 4, or both, are embodied as instructions stored on a computer-readable storage device. In a particular implementation, a computer-readable storage device stores instructions that, when executed by a processor, cause the processor to perform operations including obtaining failure initiation characteristics of a bonding layer of one or more bonded structures. The operations include determining, based on the failure initiation characteristics, a first characteristic dimension for each analysis element of a first portion of a finite element analysis model. The first portion corresponds to a first portion of the bonding layer. The operations include obtaining failure propagation characteristics of the bonding layer. The operations include determining, based on the failure propagation characteristics, a second characteristic dimension for each analysis element of a second portion of the finite element analysis model. The second portion corresponds to a second portion of the bonding layer. The operations include assigning a first set of material parameters of the bonding layer to analysis elements of the first portion of the finite element analysis model. The operations include assigning a second set of material parameters of the bonding layer to analysis elements of the second portion of the finite element analysis model. Values of the one or more material parameters of the first set of material parameters are different from corresponding values of the one or more material parameters of the second set of material parameters. The operations further include evaluating failure modes of the one or more bonded structures based on a solution to the finite element analysis model, the first set of material parameters, and the second set of material parameters.

In a particular implementation, the first set of material parameters is assigned based on the first characteristic dimension, and the second set of material parameters is assigned based on the second characteristic dimension. For example, the first set of material parameters 148 is assigned based on the first characteristic dimension 144, and the second set of material parameters 150 is assigned based on the second characteristic dimension 146 as described with reference to FIG. 1. Additionally, or alternatively, the second set of material parameters is assigned dynamically based on the second characteristic dimension. For example, the cohesive strength (e.g., the second set of material parameters) can be dynamically assigned, as described with reference to FIG. 3.

Although one or more of FIGS. 1-4 may illustrate systems, apparatuses, and/or methods according to the teachings of the disclosure, the disclosure is not limited to these illustrated systems, apparatuses, and/or methods. One or more functions or components of any of FIGS. 1-4 as illustrated or described herein may be combined with one or more other portions of another of FIGS. 1-4. For example, one or more elements of the method 300 of FIG. 3, the method 400 of FIG. 4, or a combination thereof, may be performed in combination with one or more elements of the method 300 of FIG. 3, the method 400 of FIG. 4, any combination thereof, or with other operations described herein. Accordingly, no single implementation described herein should be construed as limiting and implementations of the disclosure may be suitably combined without departing form the teachings of the disclosure. As an example, one or more operations described with reference to FIGS. 3-4 may be optional, may be performed at least partially concurrently, and/or may be performed in a different order than shown or described.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method of predicting failure initiation and propagation of one or more bonded structures, the method comprising:
    obtaining failure initiation characteristics of a bonding layer of the one or more bonded structures;
    determining, based on the failure initiation characteristics, a first characteristic dimension for each analysis element of a first portion of a finite element analysis model, the first portion corresponding to a first portion of the bonding layer;
    obtaining failure propagation characteristics of the bonding layer;
    determining, based on the failure propagation characteristics, a second characteristic dimension for each analysis element of a second portion of the finite element analysis model, the second portion corresponding to a second portion of the bonding layer;
    assigning a first set of material parameters of the bonding layer to analysis elements of the first portion of the finite element analysis model;
    assigning a second set of material parameters of the bonding layer to analysis elements of the second portion of the finite element analysis model, wherein values of one or more material parameters of the first set of material parameters are different from corresponding values of the one or more material parameters of the second set of material parameters; and
    evaluating failure modes of the one or more bonded structures based on a solution to the finite element analysis model, the first set of material parameters, and the second set of material parameters.

2. The method of claim 1, wherein the second characteristic dimension is different than the first characteristic dimension.

3. The method of claim 1, wherein the failure initiation characteristics and the failure propagation characteristics correspond to delamination, disbond, decohesion, or separation of the one or more bonded structures.

4. The method of claim 1, wherein the first set of material parameters comprises a first cohesive strength, the first cohesive strength based on the first characteristic dimension, and wherein the second set of material parameters comprises a second cohesive strength, the second cohesive strength based on the second characteristic dimension.

5. The method of claim 4, wherein a value of the second cohesive strength is different than a value of the first cohesive strength.

6. The method of claim 1, wherein the second set of material parameters is assigned dynamically based on the second characteristic dimension.

7. The method of claim 6, further comprising determining a direction of propagation of a failure based on a damage index associated with the bonding layer, wherein the second portion of the bonding layer is proximate to the first portion of the bonding layer in the direction of the propagation of the failure.

8. The method of claim 1, wherein the first set of material parameters and the second set of material parameters are assigned based on predetermined values.

9. The method of claim 1, further comprising:
    determining, based on the failure propagation characteristics, a third characteristic dimension for each analysis element of a third portion of the finite element analysis model, the third portion corresponding to a third portion of the bonding layer; and assigning a third set of material parameters of the bonding layer to analysis elements of the third portion of the finite element analysis model.

10. The method of claim 1, further comprising estimating a crack tip process zone corresponding to a failure in the bonding layer, the crack tip process zone corresponding to a region of damage surrounding the failure, wherein the first characteristic dimension is based at least on a size of the crack tip process zone.

11. The method of claim 1, wherein evaluating the failure modes of the one or more bonded structures comprises determining a load associated with initiation of a failure in the one or more bonded structures, determining a length of propagation of the failure, or a combination thereof.

12. The method of claim 11, further comprising initiating display of a report that includes the load, the length of the propagation of the failure, or a combination thereof.

13. The method of claim 1, wherein the bonding layer corresponds to a cohesive element in the finite element analysis model.

14. The method of claim 1, wherein the finite element analysis model is solved without use of a predetermined failure location.

15. An apparatus for predicting failure initiation and propagation of one or more bonded structures, the apparatus comprising:
    a processor; and
    a memory coupled to the processor and storing instructions executable by the processor to perform operations comprising:
        obtaining failure initiation characteristics of a bonding layer of the one or more bonded structures;
        determining, based on the failure initiation characteristics, a first characteristic dimension for each analysis element of a first portion of a finite element analysis model, the first portion corresponding to a first portion of the bonding layer;
        obtaining failure propagation characteristics of the bonding layer;
        determining, based on the failure propagation characteristics, a second characteristic dimension for each analysis element of a second portion of the finite element analysis model, the second portion corresponding to a second portion of the bonding layer;
        assigning a first set of material parameters of the bonding layer to analysis elements of the first portion of the finite element analysis model;
        assigning a second set of material parameters of the bonding layer to analysis elements of the second portion of the finite element analysis model, wherein values of one or more material parameters of the first set of material parameters are different from corresponding values of the one or more material parameters of the second set of material parameters; and
        evaluating failure modes of the one or more bonded structures based on a solution to the finite element analysis model, the first set of material parameters, and the second set of material parameters.

16. The apparatus of claim 15, wherein the first set of material parameters comprises a first cohesive strength, and wherein the second set of material parameters comprises a second cohesive strength that is different than the first cohesive strength.

17. The apparatus of claim 15, further comprising a display device configured to display a visual representation of the failure modes and a report that indicates a load associated with initiating a failure in the bonding layer, a length of propagation of the failure, or a combination thereof.

18. A computer-readable storage device storing instructions that, when executed by a processor, cause the processor to perform operations comprising:
    obtaining failure initiation characteristics of a bonding layer of one or more bonded structures;
    determining, based on the failure initiation characteristics, a first characteristic dimension for each analysis element of a first portion of a finite element analysis model, the first portion corresponding to a first portion of the bonding layer;
    obtaining failure propagation characteristics of the bonding layer;
    determining, based on the failure propagation characteristics, a second characteristic dimension for each analysis element of a second portion of the finite element analysis model, the second portion corresponding to a second portion of the bonding layer;
    assigning a first set of material parameters of the bonding layer to analysis elements of the first portion of the finite element analysis model;
    assigning a second set of material parameters of the bonding layer to analysis elements of the second portion of the finite element analysis model, wherein values of one or more material parameters of the first set of material parameters are different from corresponding values of the one or more material parameters of the second set of material parameters; and
    evaluating failure modes of the one or more bonded structures based on a solution to the finite element analysis model, the first set of material parameters, and the second set of material parameters.

19. The computer-readable storage device of claim 18, wherein the first set of material parameters is assigned based on the first characteristic dimension, and wherein the second set of material parameters is assigned based on the second characteristic dimension.

20. The computer-readable storage device of claim 18, wherein the second set of material parameters is assigned dynamically based on the second characteristic dimension.

* * * * *